United States Patent Office 2,711,402
Patented June 21, 1955

2,711,402

ALUMINATES AS ESTER-INTERCHANGE CATALYSTS IN MAKING POLYESTERS

Norman Fletcher, Blackley, Manchester, England, assignor to Imperial Chemical Industries Limited, London, England, a corporation of Great Britain No Drawing. Application April 16, 1954,
Serial No. 423,830

Claims priority, application Great Britain April 30, 1953

5 Claims. (Cl. 260—75)

This invention relates to an improved process for the manufacture of highly polymeric polymethylene terephthalates, particularly polyethylene terephthalate.

The highly polymeric polymethylene terephthalates are linear polyesters having great value as fibre and film-forming material. They are made by a polycondensation reaction by heating a derivative of terephthalic acid capable of undergoing a condensation reaction with itself e. g. bis(hydroxy alkyl) terephthalate. The derivative of terephthalic acid may be formed by any known method e. g. by reacting a glycol with terephthalic acid or by an ester interchange reaction using a glycol and an ester of terephthalic acid, or by reacting an alkylene oxide with terephthalic acid.

Of the highly polymeric polymethylene terephthalates that derived from ethylene glycol and terephthalic acid i. e. polyethylene terephthalate is the best known commercially as a fibre and film-forming material. In the manufacturing process most commonly used to make polyethylene terephthalate the first step is an ester interchange reaction between ethylene glycol and dimethyl terephthalate to form bis(beta-hydroxyethyl) terephthalate. This compound is then polycondensed under reduced pressure and at a high temperature.

To carry out the manufacture of these linear polyesters in a reasonable time, it is necessary to use a catalyst. Many catalysts have been disclosed for this purpose but we have found that those giving a rapid production rate also tend to bring about a rapid rate of polymer degradation. Another disadvantage is that many of the known catalysts produce a polymer having a yellowish colour or a cloudy appearance. In the manufacture of fibers a colour as near white as possible is required and for film making a clear bright polymer is necessary.

The present invention comprises an improved process for manufacturing highly polymeric polymethylene terephthalates by polymerising a bis(hydroxy alkyl) terephthalate using as a catalyst an aluminate, which is soluble in the reaction mixture.

It is preferred that the aluminate should be readily soluble in glycol. The even distribution of the catalysts is aided by using them in finely powdered form, dispersed or dissolved in glycol. Suitable aluminates include those of the alkali metals and alkaline earth metals.

To ensure that a near white polymer is obtained, the amount of catalyst used should be such that the final polyester contains less than 0.05% by weight of aluminium metal.

When the first step in the production of the highly polymeric polymethylene terephthalate is an ester interchange reaction, e. g. glycol and dimethyl terephthalate to form bis(betahydroxyethyl) terephthalate, we prefer that in addition to the aluminate an ester interchange catalyst should be used. Many such catalysts are known but we have found that calcium acetate, use with the aluminate, gives polyesters of good colour which do not tend to degrade when held in the molten state. Both catalysts can be added at the start of the ester interchange reaction if desired.

Our invention is illustrated but not limited by the following examples in which all parts are by weight:

Example 1

100 parts of bis-hydroxethyl terephthalate are melted under oxygen free nitrogen in a 4 litre vessel fitted with a stirrer and having two outlets one of which is connected to a vacuum pump and the other closed. The molten mass is stirred and 0.045 part of sodium aluminate added, after which the temperature is raised to 280° C. in two hours. When the temperature reaches 245° C. the vacuum pump is brought into action and the pressure reduced to below 1 mm., the reaction continuing for 1¼ hours. The stirrer is then stopped, the vacuum pump disconnected and the gas space above the molten material filled with nitrogen under pressure. On opening the other outlet, molten polymer is extruded by the nitrogen pressure, quenched in water, dried and cut into chips.

The product is a clear polymer, softening point 265° C., intrinsic viscosity (determined in o-chlorphenol) 0.71. Filaments of good colour can be melt spun from the polymer and drawn into useful textile yarns.

Example 2

100 parts of dimethyl terephthalate and 75 parts of ethylene glycol are melted under deoxidised nitrogen. At a temperature of 150° C., 0.08 part of calcium acetate, 0.06 part of calcium aluminate are added, dispersed in one part of ethylene glycol. Ester interchange is carried out within a temperature range of 160°–215° C. at atmospheric pressure. Methanol is distilled off, the reaction being completed in 3½ hours.

The bis-hydroxyethyl terephthalate is transferred to a stainless steel 4 litre vessel and 0.5 part of titanium dioxide added, dispersed in ethylene glycol. Polymerisation is carried out as in Example 1, the time taken being 2 hours.

The product is a white polymer, intrinsic viscosity 0.69 (determined in o-chlorphenol). Filaments of good colour can be melt-spun from the polymer and drawn into useful textile fibres.

Example 3

The process of Example 2 is repeated using 0.08 part calcium acetate and 0.03 part sodium aluminate. On the 350 litre scale ester interchange was completed in seven hours and the polymerisation at 280° C. took six hours. No titanium dioxide was added.

A clear product is obtained of intrinsic viscosity 0.70 and softening point 263.5° C.

Example 4

The process of Example 1 is repeated on the 4 litre scale using as catalyst 0.06% of zinc aluminate in place of 0.045 part of sodium aluminate, and with the addition of 0.5 part of titanium dioxide. After the application of vacuum (at 245° C.) the temperature is raised to 275° C. Polymerisation is carried out for 1⅔ hours at a pressure below 1 mm. and the polymer is extruded as in Example 1.

The product is a clear polymer, intrinsic viscosity 0.65 (determined in o-chlorphenol). Filaments of good colour can be melt-spun from the polymer and drawn into textile yarns.

The intrinsic viscosity $n$, referred to in the examples, is determined in solution in o-chlorphenol at 25° C. and serves as a measure of the degree of polymerisation. It is calculated according to the formula $$n = \frac{n_s}{c}$$

where $n_s$ = specific viscosity i. e.

$$\frac{\text{flow time of solution}}{\text{flow time of o-chlorphenol}} - 1$$

and $c$ = concentration of solution in gms. per 100 ml.

The polymers made according to the foregoing examples were compared with polymer made under the same conditions using the well known catalyst, lead oxide. In all cases the polymer colour using an aluminate catalyst, was superior to that obtained using lead oxide.

What we claim is:

1. A process according to claim 3 wherein the final polyester contains less than 0.05% by weight of aluminium metal.

2. A process according to claim 3 wherein the highly polymeric polymethylene terephthalate is polyethylene terephthalate.

3. A process for the manufacture of highly polymeric polymethylene terephthalates which comprises polymerizing a bis (hydroxy alkyl) terephthalate in the presence of an aluminate which is soluble in the reaction mixture as a catalyst, said aluminate being selected from the group consisting of the alkali metal and alkaline earth metal aluminates and zinc aluminate.

4. The process of claim 3 wherein said aluminate catalyst is sodium aluminate.

5. A process for manufacturing highly polymeric polymethlyene terephthalates which comprises the steps of forming a bis (hydroxy alkyl) terephthalate from a glycol and an alkyl ester of terephthalic acid in the presence of calcium acetate as an ester interchange catalyst and thereafter polymerizing the bis (hydroxy alkyl) terephthalate by heating under subatmospheric pressure in the presence of an aluminate which is soluble in the reaction mixture as a catalyst, said aluminate being selected from the group consisting of the alkali metal and alkaline earth metal aluminates and zinc aluminate.

No references cited.